United States Patent [19]

Becker

[11] 3,841,148
[45] Oct. 15, 1974

[54] TETRAHEDRAL STEREOTAXIC JIG
[75] Inventor: Edward B. Becker, New Orleans, La.
[73] Assignee: The United States of America as represented by the Secretary of the Navy, Washington, D.C.
[22] Filed: Dec. 21, 1973
[21] Appl. No.: 427,196

[52] U.S. Cl. .................................... 73/65, 128/25
[51] Int. Cl. ........................................ G01m 1/00
[58] Field of Search............. 73/65; 128/2 S, 303 B

[56] References Cited
UNITED STATES PATENTS
2,995,924  8/1961   Karpovich............................. 73/65
3,106,091  10/1963  Korr..................................... 73/65
3,223,087  12/1965  Vladyka et al................. 128/303 B
3,405,563  6/1962   Eckles et al. .......................... 73/65

Primary Examiner—Charles A. Ruehl
Attorney, Agent, or Firm—Richard S. Sciascia; Don D. Doty; Harvey A. David

[57] ABSTRACT

A stereotaxic jig is described in the form of a rigid tetrahedral frame having means for holding an object in a determinable position therein. The jig is characterized by vertex pins and edge mid-point pins extending outwardly of the frame and cooperable with supporting apparatus such as pendulum wires and load measuring devices. The jig thereby serves as an object-to-procedure interface in mass parameter determining calculations.

7 Claims, 3 Drawing Figures 3,841,148

TETRAHEDRAL STEREOTAXIC JIG

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

This invention relates to measurements or determinations of parameters such as center of gravity and moments of inertia of irregular and heterogeneous objects, and more particularly to improved stereotaxic apparatus for use in making such determinations.

Center of gravity and moment of inertia measurements on heterogeneous objects are rendered particularly difficult when the object involves complex and irregular distributions of mass between rigid and soft or flexible portions, such as occur in the human anatomy. Various measurements of such parameters are desirable, for example, with respect to the human head or head and neck combination, for use in predicting the effects on persons subjected to various forces such as acceleration, deceleration, and the like in both normal and abnormal situations, say in the operation of aircraft as an example. Studies using such measurements are invaluable in the design of equipment for the comfort, safety, and operational efficiency of persons in certain occupational situations.

Various direct observations have, of course, been made that have provided considerable useful data, for example again in the use of the human head or head and neck, as well as of other portions of the anatomy. These observations have included weighing and measuring of the total object, weighing and measuring of separated portions thereof, e.g., the bony structures, and other techniques. Unfortunately, these observations are the result of considerable work time and necessitate destruction of the object. Also, the size, weight, and distributions of density and rigidity vary considerably from subject to subject in the case of human body structure. Accordingly, computations or derivations of centers of gravity and moments of inertia from such observations have been difficult or impossible to relate to specific land marks that can be used for ready determination of these parameters from objects or subjects without such destructive techniques.

SUMMARY OF THE INVENTION

The invention aims to overcome some or all of the foregoing problems by providing a novel stereotaxic jig in which an object, of the heterogeneous class discussed above, can be positioned with respect to certain identifiable landmarks common to such objects, and measurements or observations taken with respect to the stereotaxic jig and object combination from which the desired parameters can be readily calculated.

With the foregoing in mind, it is a principal object of the invention to provide a novel and inexpensive stereotaxic jig for use in center of gravity and inertial determinations.

Another object of the invention is the provision of a stereotaxic jig that is easy to use and affords reliably repeatable performance in the taking of measurements.

Still another object is the provision of a stereotaxic jig of the foregoing character that comprises a framework having six bars or struts, each of equal length and joined together substantially in the form of an equilateral tetrahedron, a plurality of pins extending from the vertices and side edges of the tetrahedron for use in interconnecting the jig with different observation taking devices, and object supporting means for holding an object under measurement within the tetrahedron.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENT

Figure 1:
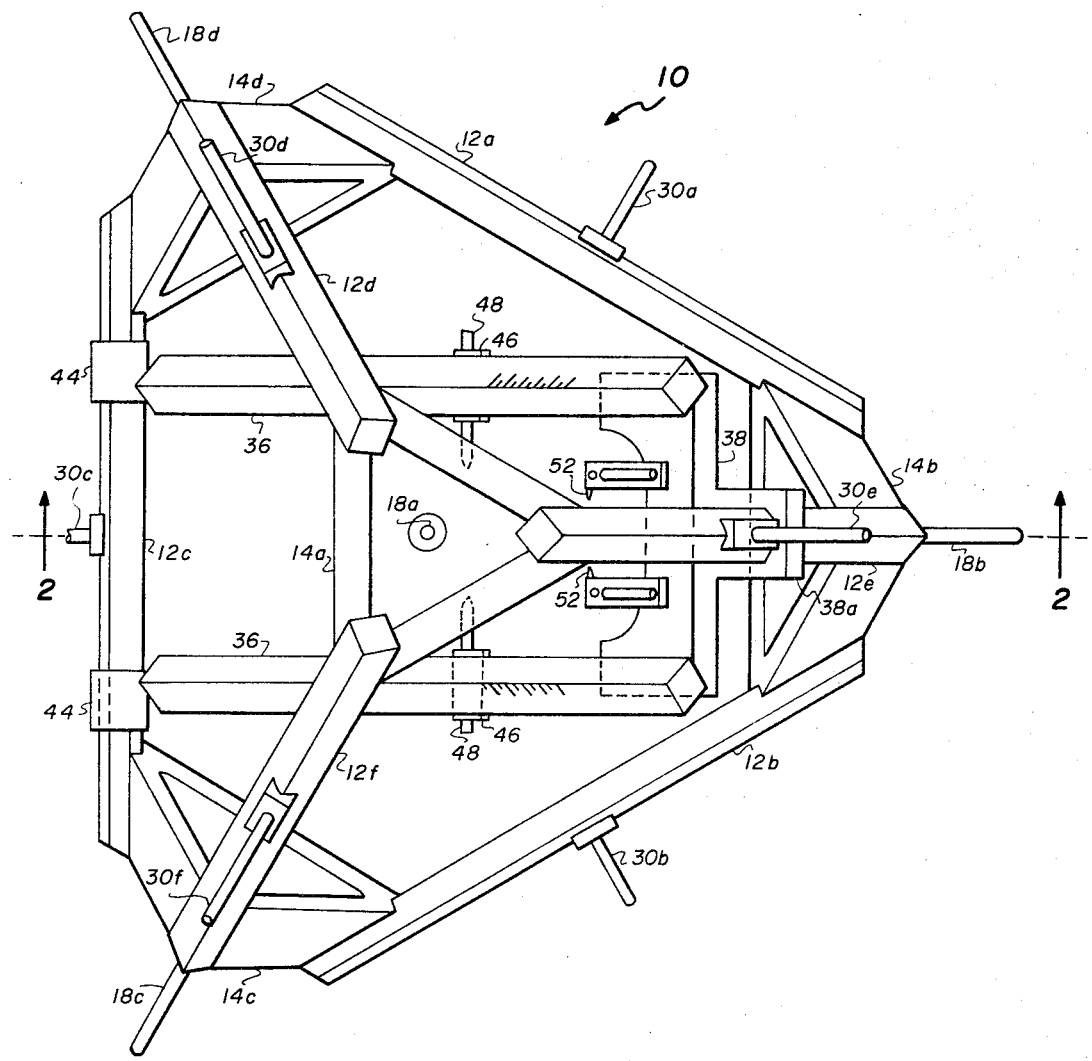
FIG. 1 is a plan view of a stereotaxic apparatus embodying the invention.

In the form of the invention illustrated in the drawings and described hereinafter, a stereotaxic jig, generally indicated at 10 in FIG. 1, is seen to comprise a framework that is substantially in the form of an equilateral tetrahedron. Jig 10 comprises six struts or bars 12a, 12b, 12c, 12d, 12e, and 12f of identical length. Bars 12a – 12f are preferably formed of aluminum or other light, rigid material, and are advantageously square in cross section. Each end of each bar is connected to an end of two other bars. This is accomplished by four identical vertex connector members 14a, 14b, 14c, and 14d.

Each of the four vertex connector members 14a – 14d comprises a truncated pyramid, conveniently formed as a hollow casting of aluminum, having three corners that make angles of 60° with the pyramid base and are grooved to receive the edges of the end portions of respective ones of bars 12a – 12f. The end portions of the bars are fixed to the associated vertex connector members by fasteners, such as recessed machine screws 16, best illustrated in FIG. 2. The resulting configuration is that of an equilateral tetrahedron, and the described construction is extremely rigid.

Stereotaxic jig 10 further comprises four vertex rods or pins 18a, 18b, 18c, and 18d that extend from the truncated top surfaces of vertex connector members 14a, 14b, 14c, and 14d, respectively. Vertex pins 18a – 18d are provided with flanges 20 that bear against the outer surfaces of the respective connector members, and are secured by nuts 22 on threaded inner ends of the pins and bearing on the inner surfaces of the connector members.

Figure 3:
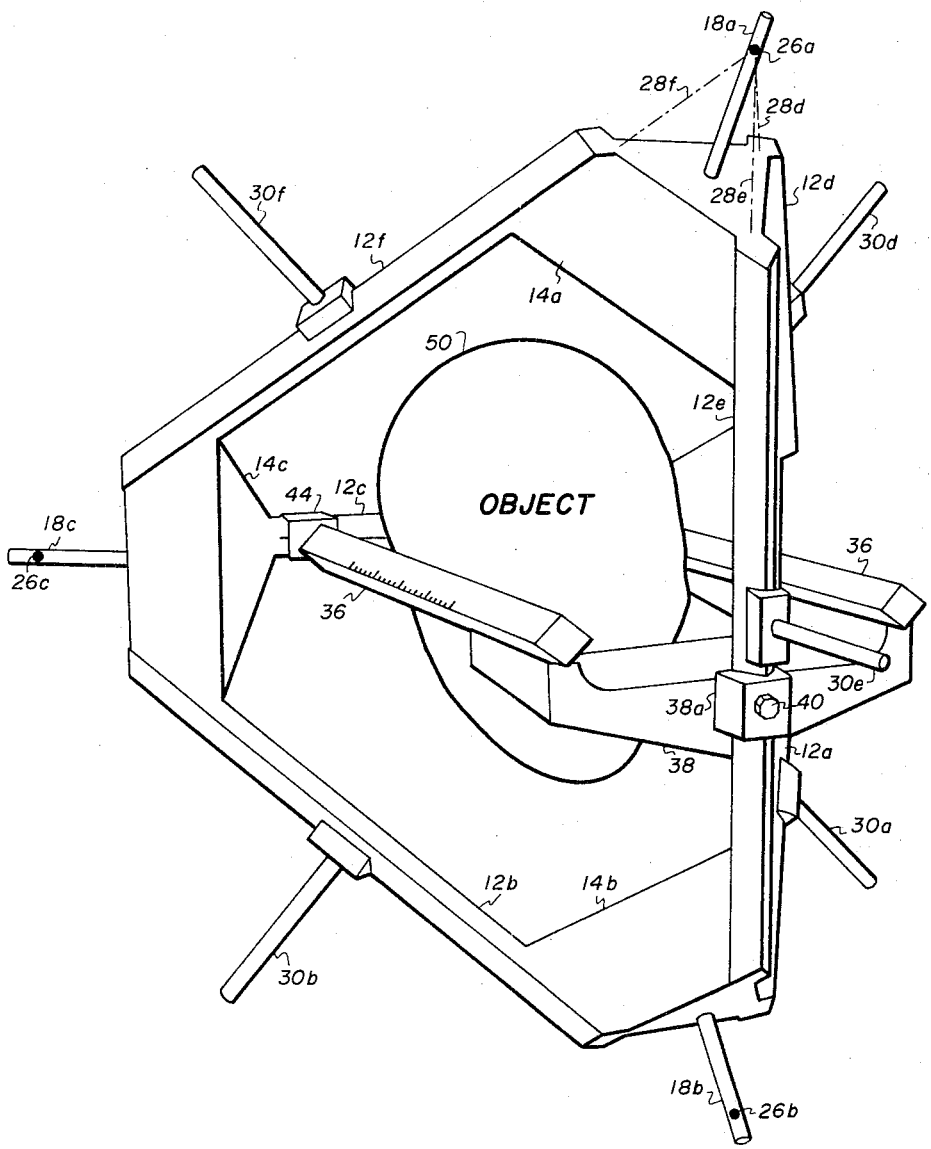
FIG. 3 is a somewhat diagrammatic perspective illustration of the apparatus, showing a supported object.

The longitudinal axes of the vertex pins 18a – 18d extend normal to planes representing the respective opposite sides of the tetrahedron defined by jig 10. These pins, the purposes of which will later be described in more detail in the discussion of the mode of operation, are of sufficient length to extend through vertex points 26a, 26b, 26c, and 26d which may be defined as the points of intersection of lines represented by inner longitudinal edges of bars 12a – 12f. This is best illustrated in FIG. 3 wherein dot and dash lines 28d, 28e, and 28f intersect at vertex point 26a on vertex pin 18a.

Figure 2:
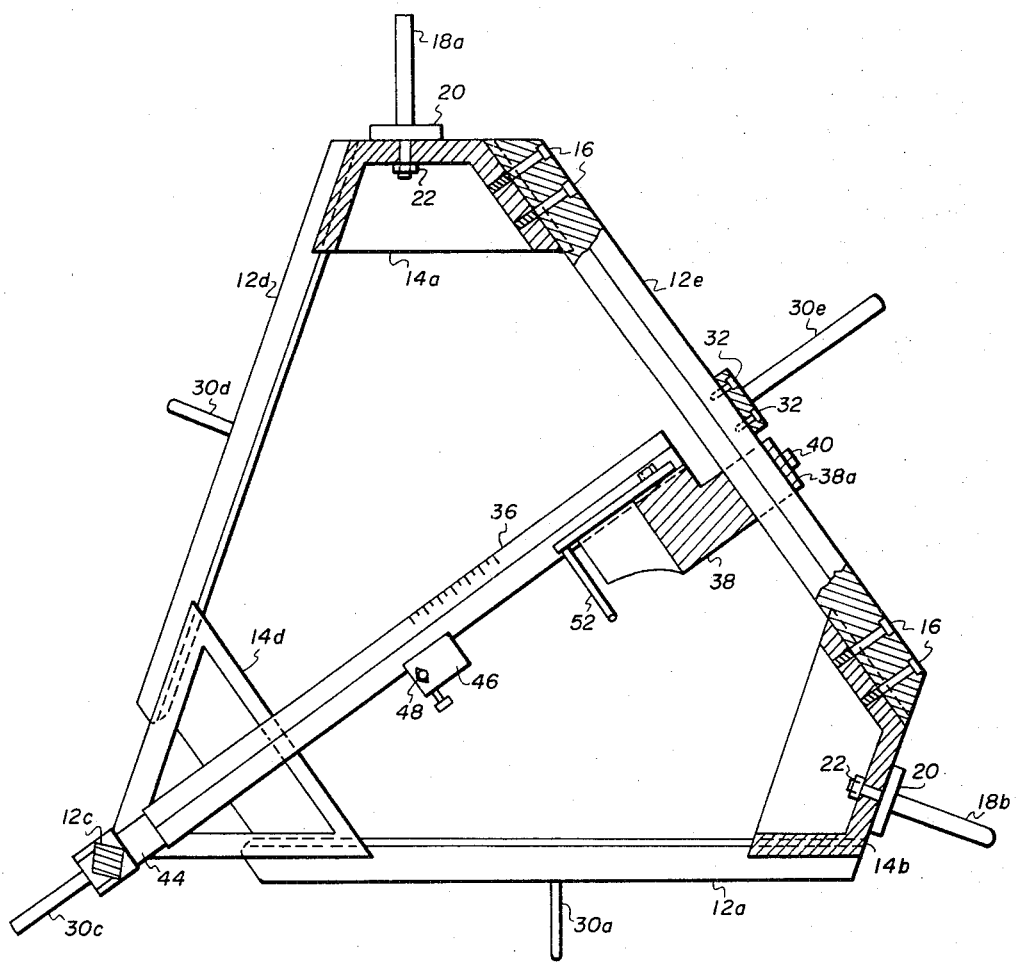
FIG. 2 is a vertical sectional view of the apparatus of FIG. 1, taken substantially along line 2—2 thereof.

Fixed at the mid-points of bars 12a – 12f are a plurality of edge pins 30a, 30b, 30c, 30d, 30e, and 30f. These edge pins, the purposes of which will later be made apparent, are each preferably provided with a grooved base secured to the respective bar by screws 32, as illustrated in FIG. 2 with respect to a representative one of the pins, namely edge pin 30e. Edge pins 30a – 30f extend normal to the respective bars to which they are attached, and normal to the bars on opposite edges of the tetrahedron shaped jig. Thus, the edge pins are arranged in three, coaxially aligned pairs, namely 30a and 30f, 30b and 30d, and 30c and 30e.

Means are provided for securing an object in a predetermined position in the stereotaxic jig 10. This means comprises a pair of bars 36 held in spaced parallel relation to one another at their proximal ends (as viewed in FIG. 3) by a cross bar 38 having an offset projection 38a encompassing bar 12e and secured with respect thereto by a screw 40. The distal ends of bars 36 are secured by suitable fitments 44 to bar 12c. Bars 36 are conveniently graduated with markings and carry adjustable clamps, such as clamps 46, that hold object engaging elements, typified by rods 48 that are adapted to fix an object 50 (shown in FIG. 3) in a predetermined position. Other object fixing rods are illustrated at 52 in FIG. 2, these rods being characterized by 90° bends near the ends thereof.

Rods 48 and 52, which are only exemplary of a variety of object engaging elements that may be used depending upon the shape and character of the object to be fixed in the stereotaxic jig, are of the type used in actual practice when the object 50 is a human head, for example. Of course, it will be understood that the stereotaxic jig of this invention may be used for determining parameters of other objects, and the particular object holding means to be used would be dictated by the physical characteristics of the object being studied. Suffice it to say for the present example that in the case of a human head it is convenient to utilize rods such as 48 to locate two of four anatomical landmarks, namely the right and left auditory meatuses, and the rods 52 to locate the other two landmarks, namely the notches formed on the right and left inferior orbital ridges.

Various available micromanipulators may be utilized if desired in locating the object within a jig, but these form no part of the invention per se.

At this point it should be noted that a stereotaxic jig 10 can be made, according to this invention, of any size necessary to suit the particular object, physical parameters of which, e.g., center of gravity and moments of inertia, are to be determined. Accordingly, no specific measurements are provided.

MODE OF OPERATION

Stereotaxic jig 10 serves as an object-to-procedure interface in the determination of center of gravity and moment of inertia of an object. Other equipments used in these procedures include a single arm balance, or other load measuring means such as an electronic strain gauge, to be used in center of gravity determination, pendulum wires for supporting the jig as a trifilar pendulum, and timing means for measuring periods of oscillation of the pendulum.

In carrying out a center of gravity determination, jig 10, with an object 50 fixed at a determinable location therein, is positioned with one side of the tetrahedron perpendicular to gravity and with the jig supported by the three edge pins that extend from the three edges defining that one side. The load on each of the three supporting edge pins is then measured, as by the single arm balance or by strain gauges. This procedure is repeated with each of the four sides, in turn, being the one perpendicular to gravity, thereby providing twelve load values for the jig and object combination. From these values the three dimensional location of the center of gravity of the jig and object combination can readily be calculated, using principals of classical physics well known to those skilled in the art to which the invention pertains.

By repeating the foregoing procedure with stereotaxic jig 10 alone, but with the object holding means therein adjusted as it was when carrying the object, twelve values can be obtained from which the location of the center of gravity 10 alone may be calculated. Determination then, of the position of the center of gravity of the object alone from the foregoing data is readily calculated.

In carrying out a moment of inertia determination, jig 10 with an object 50 fixed at a determinable location therein, is suspended as a pendulum, preferably a trifilar pendulum wherein the supporting wires of known length are connected to three of the vertex pins with the connections lying in a plane perpendicular to gravity, the wires extending parallel to one another and fixed at their upper ends in a second plane perpendicular to gravity. Four values of periods of rotational oscillation are obtained, one for each possible set of three vertex pins. An additional six values of periods of rotational oscillation are obtained, one for each of six sets each consisting of two vertex pins and one edge pin. The resulting ten values of rotational periods for ten different orientations of the jig and object combination are used in calculations to yield the full three dimensional inertia tensor.

By repeating the foregoing pendulum procedure with the jig alone, an additional 10 values of rotational period are obtained from which are calculated the three dimensional inertia tensor for the jig. From this and the inertia tensor for the jig and object combination may be calculated the moment of inertia tensor for the object alone.

From the foregoing, it will be appreciated that the invention has provided a novel stereotaxic jig that fulfills the aforementioned objects, and serves as a particularly useful interface between an object, notably a non-homogeneous anatomical structure, and procedures using classical approaches to center of gravity and moment of inertia determinations.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

What is claimed is:

1. A stereotaxic jig of the character described, said jig comprising:
    a framework comprising six edge bars of substantially equal length and cross sectional area, said six edge bars being joined together substantially in the form of an equilateral tetrahedron with each end of each edge bar being connected to ends of two other edge bars substantially at each vertex of said tetrahedron;

object holding means, mounted on said framework, for securing an object in a selected position substantially within said tetrahedron; and means, disposed at predetermined locations on said framework, for cooperation with support means during measurements of physical constants of said jig in combination with an object and of said jig alone.

2. A stereotaxic jig as defined in claim 1, and wherein said framework further comprises:

four vertex connector members, each substantially in the form of a truncated three sided pyramid;

each of said connector members rigidly fixed thereto one end of three of said six edge bars.

3. A stereotaxic jig as defined in claim 2, and wherein said means for cooperation with support means comprises:

four vertex pins, each extending outwardly from a respective one of said connector members along an axis extending normal to the opposite side plane of said tetrahedron, and through a vertex point defined as an intersection of lines extending longitudinally of the three edge bars having their ends fixed to the respective connector members.

4. A stereotaxic jig as defined in claim 3, and wherein said means for cooperation with support means further comprises:

six edge pins, each extending outwardly from the mid point of the length of a respective one of said six edge bars along an axis normal to said one edge bar and to an edge bar along the opposite edge of said tetrahedron, whereby said edge pins comprise three pairs of coaxially aligned edge pins.

5. A stereotaxic jig as defined in claim 4, and wherein said object holding means comprises:

a cross bar adjustably secured to one of said edge bars; and a pair of spaced, parallel bars, each extending from one end of said cross bar to an edge bar parallel to said cross bar.

6. A stereotaxic jig as defined in claim 5, and wherein said object holding means further comprises:

clamp means adjustably mounted on said parallel bars;

object engaging means held by said clamp means; and indicator means for determining the position of an object when held in said jig.

7. A stereotaxic jig for use in determining mass parameters of a heterogeneous object, said jig comprising:

six bars of substantially equal length and cross sectional area;

four vertex connector members each in the form of a hollow, truncated 60° pyramid characterized by grooves defined in three edges thereof;

each of said vertex connector members having ends of three of said six bars fixed in said grooves so that said six bars and said four vertex connector members form a framework defining the edges of an equilateral tetrahedron;

four vertex pins, each vertex pin extending outwardly from the truncated portion of a respective one of said vertex connector members;

six edge pins, each extending outwardly from the mid-point of the length of a respective one of said six bars along an axis normal to said one bar and to another of said bars on the opposite side of said framework, whereby said edge pins comprise three pairs of coaxially aligned edge pins;

a cross bar adjustably secured to one of said six bars in a plane normal thereto;

a pair of spaced, parallel, object supporting bars, each extending from one end of said cross bar to a one of said six bars that is parallel to said cross bar;

a plurality of clamps adjustably positioned on said parallel, object supporting bars;

object engaging rods held by said clamps for fixing an object in a determinable position in said framework; and index means on said parallel, object supporting bars, said index means being cooperable with said clamp means for use in determining said position.

* * * * *